United States Patent
Kogan et al.

(10) Patent No.: US 7,752,225 B2
(45) Date of Patent: Jul. 6, 2010

(54) REPLICATION AND MAPPING MECHANISM FOR RECREATING MEMORY DURATIONS

(75) Inventors: David Kogan, San Mateo, CA (US); Rajendra S. Pingte, Foster City, CA (US); Chao Liang, Fremont, CA (US); Yujie Cao, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 309 days.

(21) Appl. No.: 11/873,410

(22) Filed: Oct. 16, 2007

(65) Prior Publication Data

US 2009/0100082 A1   Apr. 16, 2009

(51) Int. Cl.
*G06F 7/00* (2006.01)
*G06F 17/30* (2006.01)

(52) U.S. Cl. .................. 707/793; 707/809; 718/1; 718/104

(58) Field of Classification Search .......... 707/100; 718/1, 104
See application file for complete search history.

(56) References Cited

U.S. PATENT DOCUMENTS

| | | | |
|---|---|---|---|
| 5,123,101 A * | 6/1992 | Sindhu ................. 711/207 |
| 6,041,357 A | 3/2000 | Kunzelman et al. | |
| 6,374,241 B1 * | 4/2002 | Lamburt et al. ............. 707/6 |
| 6,601,101 B1 | 7/2003 | Lee et al. | |
| 6,658,433 B1 | 12/2003 | Toohey | |
| 2002/0133515 A1 * | 9/2002 | Kagle et al. ............. 707/511 |
| 2003/0007497 A1 | 1/2003 | March et al. | |
| 2003/0108052 A1 | 6/2003 | Inoue et al. | |
| 2003/0182294 A1 * | 9/2003 | Kamen et al. ............. 707/100 |
| 2005/0038848 A1 * | 2/2005 | Kaluskar et al. ........... 709/201 |
| 2005/0239476 A1 | 10/2005 | Betrabet et al. | |
| 2006/0036617 A1 | 2/2006 | Bastawala et al. | |

OTHER PUBLICATIONS

"Notice of Allowance and Fee Due" received in U.S. Appl. No. 10/917,843 received on Apr. 1, 2008 (7 pages).

* cited by examiner

*Primary Examiner*—James Trujillo
*Assistant Examiner*—Pavan Mamillapalli
(74) *Attorney, Agent, or Firm*—Hickman Palermo Truong & Becker LLP; Marcel K. Bingham; Daniel D. Ledesma

(57) ABSTRACT

Techniques for migrating duration trees from a source database server (or instance) to a destination database server (or instance) are provided. A duration is a memory management construct that allows database components to group related areas of memory together. A source duration tree is captured at the source database server and combined with a destination duration tree at the destination database server. Any duration identifiers in the source duration tree that conflict with (i.e., are the same as) a duration identifier in the destination duration tree are mapped to new duration identifiers.

20 Claims, 2 Drawing Sheets

REPLICATION AND MAPPING MECHANISM FOR RECREATING MEMORY DURATIONS

RELATED APPLICATIONS

The present application is related to U.S. application Ser. No. 10/917,953, Transparent Session Migration Across Servers, filed by Sanjay Kaluskar, et al. on Aug. 12, 2004, and incorporated herein by reference.

FIELD OF THE INVENTION

The present invention relates to migrating duration information in a computing system.

BACKGROUND

An important feature of a database management system ("DBMS") is to process requests from clients by retrieving requested information from a database and transmitting that information to the clients. A database session (referred to simply as a session) is a particular connection established for a client and a DBMS through which a series of request may be made. The requests are carried out by one or more session processes. The requests, which may be in the form of function or remote procedure invocations, include requests to begin execution of a transaction, to execute queries, to perform updates and other types of transaction operations, to commit or otherwise terminate a transaction, and to terminate a database session.

The DBMS on which a database session is established maintains session state data that reflects the current state of a database session. Such information contains, for example, the identity of the client for which the session was established, the session transaction state, and temporary variable values generated by processes and database components executing software within a session.

A database component is a set of software modules that provide specialized and related functions for a database server. Non-limiting examples of database components include a cursor component (e.g., for managing cursors within a database server), a PL/SQL component (e.g., for executing code written in PL/SQL), a session parameter component (e.g., for managing attributes that generally control how calls and requests associated with a session are processed), and a Java component (e.g., for executing code written in Java).

Durations

A DBMS may include multiple memory management tools used by components of the DBMS. One such memory management tool is a duration system. With a duration system, database components may allocate memory for specific periods of time. Such specific periods of time are referred to herein as "durations." A database component may start a duration and end a duration. A data structure is created when a database component starts a duration. The duration data structure "stores" data associated with the duration. During a duration, a database component may allocate one or more areas of memory and associate that memory with the duration. A database component may also "pin" an object to a duration. When a duration ends, a database component (e.g., the database component that started the duration) frees each allocated area of memory associated with the duration.

Such a duration system allows database components to group related pieces of memory together. With a duration system, database components are not required to keep track of individual pieces of memory, but instead may only be required to keep track of the duration data structure with which those pieces of memory are associated.

Each connection between a client and a database system is associated with predefined durations, such as a session, transactions, and calls. Each session may include one or more transactions. Each transaction may include one or more calls.

A transaction is a logical unit of work that is performed as an atomic unit. In most DBMSs, all changes made by a transaction must be either committed or rolled back. When a transaction is committed, all of the changes specified by the transaction are made permanent. On the other hand, when a transaction is rolled back, all of the changes specified by the transaction already made are retracted or undone, as if the changes were never made.

In addition to the predefined durations of session, transaction, and call, database components create duration data structures in order to precisely associate related memory. Duration data structures may be organized in a hierarchy, such that new durations may be based on older durations.

For purposes of brevity, the description hereafter will refer to a duration data structure simply as a duration. Thus, database components create durations that are organized in a duration hierarchy.

A duration that is based on another duration is referred to herein as a "child" duration, whereas a duration from which a child duration is based is referred to herein as a "parent" duration. For example, a PL/SQL package is instantiated and a duration is created for that package. A user calls a PL/SQL function, such as createTempLob( ). In response, a PL/SQL package executes the function, which initiates a second duration to maintain the temporary LOB (Large Object) that is created. The second duration is made a child of the duration associated with the PL/SQL package.

A set of durations that are related to each other are referred to herein as a "duration tree." Terminating a parent duration also terminates each child duration of the parent duration. A duration may be terminated by a function explicitly issued by a database component that determines that the duration is a child of a duration that is terminated. Given the example above, if the duration for the PL/SQL package is terminated, then the second duration is automatically terminated.

Each duration is associated with an identifier, such as an integer. Duration identifiers are unique with respect to a given session. Thus, no two durations in the same session are associated with the same duration identifier. A duration identifier is used by database components to properly identify the duration and access the memory and/or objects associated with the duration.

Database components are not required to know (1) the organization of a duration tree, (2) who created a duration, or (3) when a duration ends in order to use the duration. Thus, for example, database component A may begin a duration and pass an identifier of the duration to database component B. Component B may then allocate a memory or object instance for that duration and return the memory to component A.

Session Migration

Database users (e.g., database administrators) occasionally desire to have the state (including session state) of one database server migrated to another database server. Similarly, database users may also desire to have the state of one database server instance, in a cluster of instances (e.g., a multinode database server), migrated to another database server instance in the cluster.

During session migration, database components of one database server (or database server instance) may want to migrate session data that was created using specific durations. Durations are not migrated. Instead, database components that use durations for memory allocation create new durations and allocate memory out of the new durations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
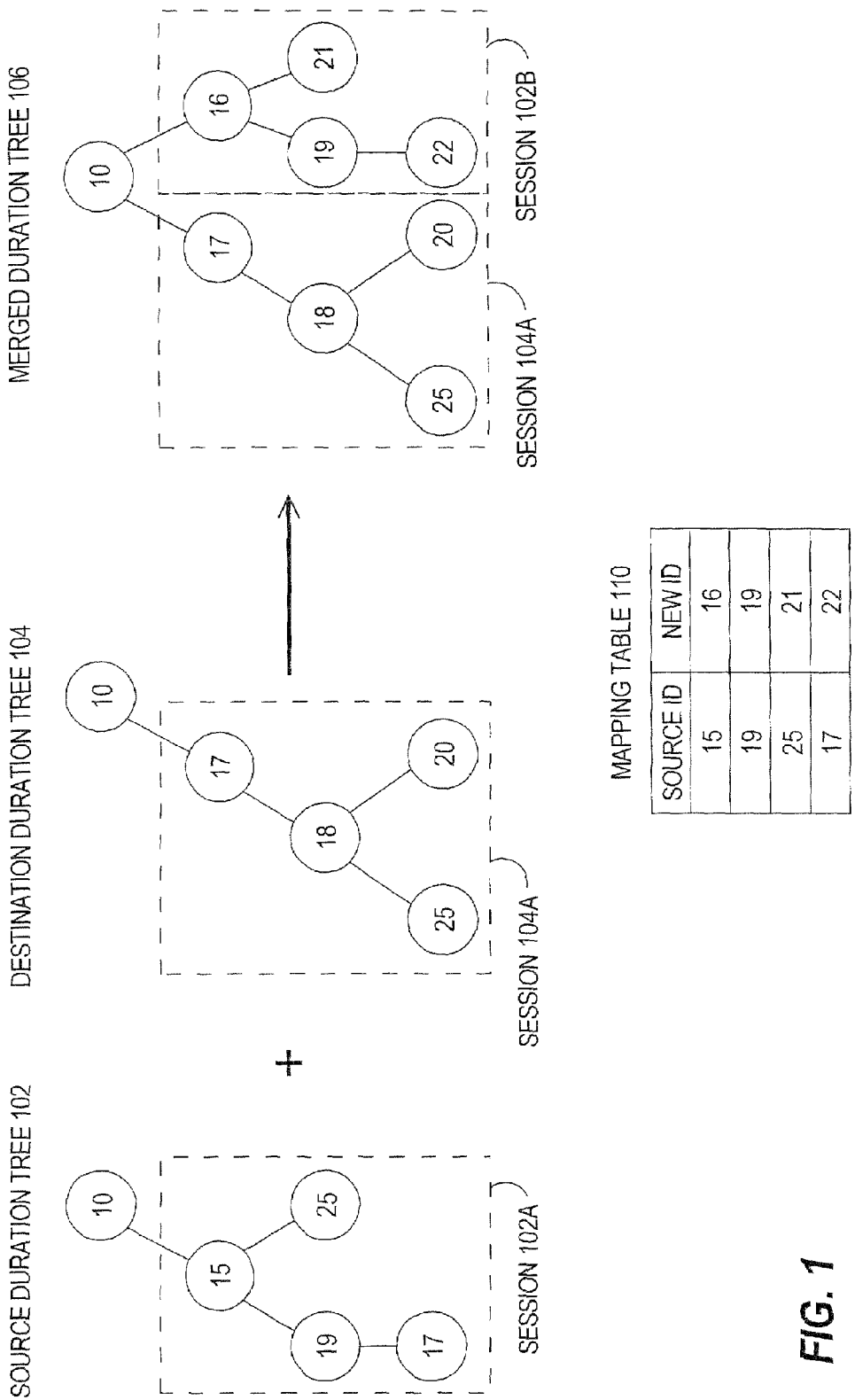
FIG. 1 illustrates how, during a session migration, a source duration tree may be combined with a destination duration tree, according to an embodiment of the invention.

In the following description, for the purposes of explanation, numerous specific details are set forth in order to provide a thorough understanding of the present invention. It will be apparent, however, that the present invention may be practiced without these specific details. For example, durations trees may be migrated from any computing system to another computing system or from one process to another process executing in the same computing system. In other instances, well-known structures and devices are shown in block diagram form in order to avoid unnecessarily obscuring the present invention.

General Overview

Techniques are provided for recreating memory durations during a migration of session state from one database server to another database server. Each duration on a source database server is associated with a unique identifier relative to identifiers of other durations on the source database server. The durations on the source database server are organized in a duration tree. During a migration of session state from the source database server to a destination database server, the duration tree is also migrated.

However, a duration's identifier on the source database server may not be unique relative to identifiers of durations in a destination duration tree on the destination database server. Thus, one or more identifiers of durations in the source duration tree are mapped to different identifiers that are unique relative to the other durations in both the source duration tree and the destination duration tree. This allows database components on the destination database server to determine which memory belongs to which duration and when to terminate durations.

Embodiments of the invention are also applicable to migrating a duration tree from one database server instance to another database server instance in a multi-node database server. However, for purposes of brevity, reference is made herein to database servers and not database server instances.

Although embodiments of the invention are described in the context of session migration, duration trees may be migrated from one database server to another database without migrating other session information.

Overview of Session Migration

There are various reasons for initiating a migration of session information. One reason may be that a database user desires to move data from one database server to another database server that executes on a machine with upgraded hardware. Another such reason may be to distribute workload across database server instances. Distributing workload is used to improve performance, by optimally balancing workload between nodes in a multi-node database server. Distributing workload also allows work to be shifted from a node that is being taken off-line for maintenance operations to another node.

Yet another reason to migrate session state may be that a user wants to test an actual workload from an existing database system on a different (e.g., new) database system. For example, a migration system of one database server may capture the session state of the server at time T1, record requests received at the database server between times T1 and T2, reproduce the session state on another database server, and then replay the workload, in the context of the captured session state, on the other database server as of T1.

Database components of one database server may want to migrate session data that was created using specific durations. However, because database components may not know who created a duration and how long the duration is going to last, the database components cannot reallocate the memory associated with the duration without support from a duration manager. This means that a duration tree associated with multiple sessions also needs to be migrated to a different database server.

However, there is a problem of the reuse of duration identifiers. Because duration identifiers are unique with respect to a given session, migrating duration identifiers creates potential conflicts between a duration that was used in a source database server (or server instance) and a corresponding duration that is already in use in a destination database server (or server instance). If duration identifiers are assigned in a deterministic manner, then collisions between identical duration identifiers are almost certain. The reuse of duration identifiers is one of the problems addressed by some embodiments of the invention.

Session Capture Stage

One or more database components may include an interface that conforms to an interface definition. An interface definition defines a set of routines, typically functions, and values returned by those routines. Examples of an interface definition include an object class defined in a computer language, an interface described by an interface definition language (e.g. OMG Interface Definition Language), or a specification written in a human language that describes the interface. Functions of a database component interface support the capture of session state and the restoring of the captured session state. Thus, migrating session state comprises at least two stages: a session capture stage (or simply "capture stage") and a session restore stage (or simply "restore stage").

During the capture stage, a source duration tree on a source database server is traversed. Any information from the source duration tree that is needed to reconstruct the source duration tree at the destination database server is captured (or saved). Non-limiting examples of such information include a duration identifier for each duration in the source duration tree and the parent duration identifier for each duration in the source duration tree.

In an embodiment, the parent duration is captured before any of its child durations, irrespective of the duration identifiers (which may not be in the order of the position of the duration in the duration tree). Thus, the capture of durations in a source duration tree may begin at the "root" duration of the source duration tree and proceed toward the "leaf" durations in the source duration tree.

In an embodiment, only the portion of a source duration tree that descends from a predefined session duration is captured. In other words, portions of the source duration tree that descend from a predefined transaction duration or call duration are not captured. This is so because session capture typically occurs on a transaction boundary, which means that any memory that is allocated from the predefined transaction and call durations and their descendents is freed before migration.

In a related embodiment, if session capture is not guaranteed to occur on a transaction boundary, then transaction durations may be captured as well. Similarly, if session capture is not guaranteed to occur on a call boundary, then call durations may also be captured.

Session Restore Stage and Mapping Table

During the restore stage, the session information from the source database server is transmitted to the destination database server, including the memory that was allocated for the durations of the source duration tree.

Also during the restore stage, the captured source duration tree is recreated on the destination database server. Because the destination database server already has its own duration tree (referred to as the "destination duration tree"), at least those duration identifiers of the source duration tree that conflict with duration identifiers of the destination duration tree cannot be used. Duration identifiers of a source duration tree that conflict with duration identifiers of a destination duration tree are referred to herein as "conflicted duration identifiers."

In an embodiment, a mapping table is created that maps conflicted duration identifiers to duration identifiers that do not conflict with the duration identifiers of any duration in the source duration tree or the destination duration tree at the destination. Such mapped-to duration identifiers are referred to herein as "new duration identifiers." The only duration identifier from a source database server that may be allowed to overlap is the duration identifier associated with a predefined session duration.

In an embodiment, the mapping table is used during the restore stage to retrieve the parents of the durations that are being restored, because those parent durations may also be mapped. Because the parent durations may be captured first, every duration (except the predefined session duration) in the source duration tree that is being restored may have its parent duration mapped in the mapping table.

Example Duration Migration

FIG. 1 illustrates how, during a session migration, a source duration tree may be combined with a destination duration tree, according to an embodiment of the invention. A source duration tree 102 resides on a source database server and is migrated to a destination database server that includes a destination duration tree 104. During (or after) the restore stage, any conflict between duration identifiers from source duration tree 102 and duration identifiers from destination duration tree 104 is resolved. In the illustrated example, the root of each duration tree is a predefined session duration, whose duration identifier is 10.

FIG. 1 further illustrates that each duration tree corresponds to a single session source duration tree 102 corresponds to session 102A and destination duration tree 104 corresponds to session 104A. However, at the time of session capture, there may be multiple sessions 102A whose root duration (e.g., duration 15) is a child of the predefined session duration. Similarly, at the time of session restore, there may be multiple sessions 104A whose root duration (e.g., duration 17) is a child of the predefined session duration.

As illustrated in FIG. 1, session 102A is associated with four durations whose identifiers are, respectively, 15, 19, 25 and 17. Session 104A is also associated with four durations whose identifiers are, respectively, 17, 18, 25, and 20. Thus, durations 17 and 25 in source duration tree 102 conflict with durations 17 and 25 in destination duration tree 104. If a duration from a source duration tree conflicts with a duration from a destination duration tree, then a database component will not know to which session a duration belongs. For example, given a duration identifier of 25, a database component on the destination database server will not know if the corresponding duration is from session 102A or session 104A.

Mapping Table 100

FIG. 1 further illustrates a mapping table 110 that is generated following the capture stage. Although not required, mapping table 110 includes an entry for each duration in source duration tree 102. Alternatively, mapping table 110 may include an entry only for those durations whose identifiers have changed. In that case, mapping table 110 would only include three entries, one for each of duration 15, 25, and 17 (because duration identifier 19 remains the same).

In either case, a database component may create a duration on the destination database server for each duration in source duration tree 102. Whatever identifier is returned from the duration creation function is used to map the old duration identifier to the new duration identifier, as long as the new duration identifier does not conflict with any other duration identifier in source duration tree 102 and destination duration tree 104.

Alternatively, a database component may create a duration on the destination database server only for those durations with corresponding conflicted duration identifiers. For example, a database component may first identify which identifiers in source duration tree 102 are conflicted duration identifiers and then call a duration creation function that returns a new duration identifier.

If only conflicted duration identifiers change, then mapping table 110 may include only two entries, one for duration 25 and one for duration 17.

As mapping table 110 illustrates, non-conflicted duration identifiers from a source duration tree are not required to map to new duration identifiers on the destination database server. Thus, durations that have migrated may map to the same identifiers they previously mapped to in the source duration tree, such as duration 19.

After source duration tree 102 has been captured from the source database server and restored on the destination database server, a merged duration tree 106 results. Merged duration tree 106 comprises two sessions: session 104A as it existed in destination duration tree 104 and session 102B, which corresponds to session 102A except that three of the durations in session 102B are associated with different duration identifiers (i.e., 16, 21, and 22) compared to their respective counterparts (i.e., 15, 25, and 17).

In order to use mapping table 110, each database component in the destination database server that uses durations should: (1) capture and restore any duration identifiers that the database components were using as part of their component migration; and (2) call a duration mapping function to map captured duration identifiers to restored duration identifiers. For future calls, the database components use the restored duration identifiers.

Individual database components are not required to know anything about the internal structure of merged duration tree 106. Once a database component identifies a duration that the database component is suppose to use, the database component may use the durations just as the old durations were used. Any database components that use durations in a session may continue using the durations from the "capture" side so long as each database component performs a mapping function first. For example, A database component has at least two options when utilizing a mapping table, such as mapping table 110. For example, a database component on the source database server issues a create_duration( ) function that returns a duration identifier (d_id). The database component then issues an allocate( ) function, with the duration identifier as an argument, that returns a pointer to allocated memory. Table 1 illustrates the two options based on this example.

| Option A | Option B |
| --- | --- |
| d_id = map(d_id) | o2 = allocate(map(d_id)) |
| ... | ... |
| end_duration(d_id) | end_duration(map(d_id)) |

According to option A, for any duration, a map function (i.e., map( )) is issued by a database component some time after the restore stage and before requests to process the duration. The map function is passed a duration identifier and, as a result, returns a duration identifier to which the passed duration identifier is mapped in a mapping table. Subsequently, any function calls that require a duration identifier as an argument use the mapped-to duration identifier. In this way, the map function is only required to be issued once.

Alternatively, according to option B, the map function is issued each time a duration identifier is required in a function's argument.

In an embodiment, a duration manager of the destination database server does not recreate any memory within the durations. Thus, individual database components of the destination database server may be required to call allocation functions with their transferred state to recreate their respective memory.

Hardware Overview

Figure 2:
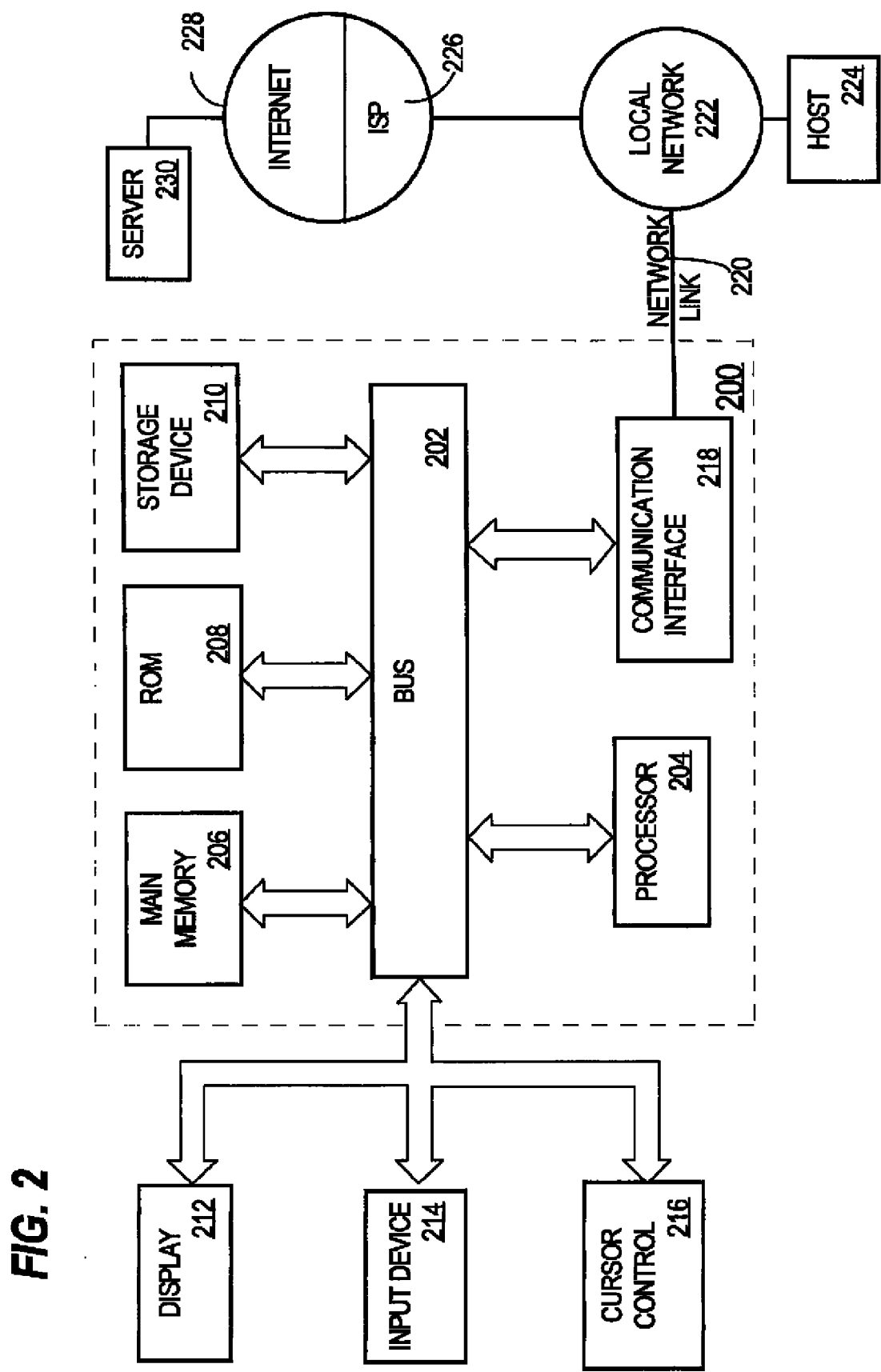
FIG. 2 is a block diagram that illustrates a computer system 200 upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to storage media and transmission media. Storage media includes both non-volatile media and volatile media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, the method comprising:
receiving an instruction to migrate a first session;
wherein the first session comprises a first tree of a first plurality of duration data structures (DDSs) that each corresponds to a different duration and a separate allocated area of memory;
wherein each DDS of the first plurality of DDSs is associated with an area of memory that is different relative to the areas of memory associated with the other DDSs in the first tree;
wherein a particular DDS of the first plurality of DDSs, if terminated, would terminate one or more other DDSs;
wherein an area of memory that corresponds to the one or more other DDSs would be deallocated by, at least in part, termination of the particular DDS;
wherein each DDS of the first plurality of DDSs is associated with an identifier that is unique relative to the identifiers of the other DDSs in the first tree;
in response to the instruction, migrating the first session;
wherein a second session comprises a second tree of a second plurality of DDSs;
wherein each DDS of the second plurality of DDSs is associated with an identifier that is unique relative to the identifiers of the other DDS in the second tree;
wherein each DDS of the first tree and second tree is associated with a different area of memory;
generating a set of one or more mappings;
wherein each mapping of the set of mappings is between an identifier associated with a DDS of the first tree and a new identifier for the DDS;
wherein the new identifier is unique relative to the identifiers of each DDS in the first tree and the second tree;
wherein the method is performed by one or more computing devices.

2. The method of claim 1, wherein:
the first session is migrated from a first database system to a second database system;
the second database system includes the second session; and
the second database system stores the set of one or more mappings.

3. The method of claim 1, wherein:
the first session is migrated from a first database server instance to a second database server instance;
the first database server instance and the second database server instance are part of the same multi-node database server;
the second database server instance includes the second session; and
the second database server instance stores the set of one or more mappings.

4. The method of claim 1, wherein:
the first session is migrated from a process executing in a database server instance to another process executing in the database server instance.

5. The method of claim 1, wherein:
the first session is migrated from a first client to a second client;
the second client includes the second session; and
the second client stores the set of one or more mappings.

6. The method of claim 1, further comprising:
calling a mapping function with a particular identifier, associated with a DDS from the first tree, as an argument of the mapping function; and
receiving, as a result of calling the mapping function, a duration identifier that corresponds to, in the set of one or more mappings, the particular identifier.

7. The method of claim 6, wherein the mapping function is called once even though an area of memory, that is associated with the DDS that is associated with the particular identifier, is accessed multiple times.

8. The method of claim 1, wherein:
migrating the first session includes capturing information about each DDS in the first tree; and
any parent DDS in the first tree is captured before any child DDSs of the parent DDS.

9. A method comprising:
generating a first tree of a first plurality of duration data structures (DDSs) that each corresponds to a different duration and a separate allocated area of memory, wherein each DDS of the first plurality of DDS is associated with an identifier that is unique relative to the identifiers of the other DDSs in the first tree;
wherein a particular DDS of the first plurality of DDSs, if terminated, would terminate one or more other DDSs;
wherein an area of memory that corresponds to the one or more other DDSs would be deallocated by, at least in part, termination of the particular DDS;
generating a second tree of a second plurality of DDSs that each corresponds to a different duration and a separate allocated area of memory, wherein each DDS of the second plurality of DDSs is associated with an identifier that is unique relative to the identifiers of the other DDSs in the second tree;
wherein each DDS of the first tree and second tree is associated with a different area of memory;
combining the first tree with the second tree; and
as part of combining the first tree with the second tree, generating a set of one or more mappings;
wherein each mapping of the set of mappings is between an identifier associated with a DDS of the first tree and a new identifier for the DDS;
wherein the new identifier is unique relative to the identifiers of each DDS in the first tree and the second tree;
wherein the method is performed by one or more computing devices.

10. The method of claim 9, further comprising:
calling a mapping function with a particular identifier, associated with a DDS from the first tree, as an argument of the mapping function; and
receiving, as a result of calling the mapping function, a duration identifier that corresponds to, in the set of one or more mappings, the particular identifier.

11. One or more storage media storing instructions for migrating session information, wherein the instructions, when executed by one or more processors, cause:
receiving an instruction to migrate a first session;
wherein the first session comprises a first tree of a first plurality of duration data structures (DDSs) that each corresponds to a different duration and a separate allocated area of memory;
wherein each DDS of the first plurality of DDSs is associated with an area of memory that is different relative to the areas of memory associated with the other DDSs in the first tree;
wherein a particular DDS of the first plurality of DDSs, if terminated, would terminate one or more other DDSs;
wherein an area of memory that corresponds to the one or more other DDSs would be deallocated by, at least in part, termination of the particular DDS;
wherein each DDS of the first plurality of DDSs is associated with an identifier that is unique relative to the identifiers of the other DDSs in the first tree;
in response to the instruction, migrating the first session;
wherein a second session comprises a second tree of a second plurality of DDSs;
wherein each DDS of the second plurality of DDSs is associated with an identifier that is unique relative to the identifiers of the other DDS in the second tree;
wherein each DDS of the first tree and second tree is associated with a different area of memory;
generating a set of one or more mappings;
wherein each mapping of the set of mappings is between an identifier associated with a DDS of the first tree and a new identifier for that DDS;
wherein the new identifier is unique relative to the identifiers of each DDS in the first tree and the second tree.

12. The one or more storage media of claim 11, wherein:
the first session is migrated from a first database server to a second database server;
the second database server includes the second session; and
the second database server stores the set of one or more mappings.

13. The one or more storage media of claim 11, wherein:
the first session is migrated from a first database server instance to a second database server instance;
the first database server instance and the second database server instance are part of the same multi-node database server;
the second database server instance includes the second session; and
the second database server instance stores the set of one or more mappings.

14. The one or more storage media of claim 11, wherein:
the first session is migrated from a process executing in a database server instance to another process executing in the database server instance.

15. The one or more storage media of claim 11, wherein:
the first session is migrated from a first client to a second client;
the second client includes the second session; and
the second client stores the set of one or more mappings.

16. The one or more storage media of claim 11, wherein the instructions include instructions which, when executed by the one or more processors, further cause the one or more processors to perform the steps of:
calling a mapping function with a particular identifier, associated with a DDS from the first tree, as an argument of the mapping function; and
receiving, as a result of calling the mapping function, a duration identifier that corresponds to, in the set of one or more mappings, the particular identifier.

17. The one or more storage media of claim 16, wherein the mapping function is called once even though an area of memory, that is associated with the DDS that is associated with the particular identifier, is accessed multiple times.

18. The one or more storage media of claim 11, wherein:
migrating the first session includes capturing information about each DDS in the first tree; and
any parent DDS in the first tree is captured before any child DDSs of the parent DDS.

19. One or more storage media storing instructions which, when executed by one or more processors, cause:
- generating a first tree of a first plurality of duration data structures (DDSs) that each corresponds to a different duration and a separate allocated area of memory, wherein each DDS of the first plurality of DDS is associated with an identifier that is unique relative to the identifiers of the other DDSs in the first tree;
- wherein a particular DDS of the first plurality of DDSs, if terminated, would terminate one or more other DDSs;
- wherein an area of memory that corresponds to the one or more other DDSs would be deallocated by, at least in part, termination of the particular DDS;
- generating a second tree of a second plurality of DDSs that each corresponds to a different duration and a separate allocated area of memory, wherein each DDS of the second plurality of DDSs is associated with an identifier that is unique relative to the identifiers of the other DDSs in the second tree;
- wherein each DDS of the first tree and second tree is associated with a different area of memory;
- combining the first tree with the second tree; and
- generating a set of one or more mappings;
- wherein each mapping of the set of mappings is between an identifier associated with a DDS of the first tree and a new identifier for the DDS;
- wherein the new identifier is unique relative to the identifiers of each DDS in the first tree and the second tree.

20. The one or more storage media of claim 19, wherein the instructions include instructions which, when executed by the one or more processors, further cause the one or more processors to perform the steps of:
- calling a mapping function with a particular identifier, associated with a DDS from the first tree, as an argument of the mapping function; and
- receiving, as a result of calling the mapping function, a duration identifier that corresponds to, in the set of one or more mappings, the particular identifier.

* * * * *

UNITED STATES PATENT AND TRADEMARK OFFICE
CERTIFICATE OF CORRECTION

| | | |
|---|---|---|
| PATENT NO. | : 7,752,225 B2 | Page 1 of 1 |
| APPLICATION NO. | : 11/873410 | |
| DATED | : July 6, 2010 | |
| INVENTOR(S) | : David Kogan et al. | |

It is certified that error appears in the above-identified patent and that said Letters Patent is hereby corrected as shown below:

In column 1, line 6, delete "application" and insert -- Application --, therefor.

In column 6, line 8, delete "session" and insert -- session. --, therefor.

In column 6, line 8, delete "source" and insert -- Source --, therefor.

Signed and Sealed this
Third Day of May, 2011

David J. Kappos
*Director of the United States Patent and Trademark Office*